(12) United States Patent  
Kung (10) Patent No.: US 6,366,440 B1
(45) Date of Patent: Apr. 2, 2002

(54) MAGNETIC CLOSURE MECHANISM FOR A PORTABLE COMPUTER

(75) Inventor: Shao-Tsu Kung, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/488,640

(22) Filed: Jan. 21, 2000

(51) Int. Cl.$^7$ ............................................. H01H 47/00
(52) U.S. Cl. ....................................... 361/147; 361/681
(58) Field of Search .................................. 361/139, 142, 361/143, 144, 147, 680; 220/230; 713/300, 320

(56) References Cited

U.S. PATENT DOCUMENTS

| | | | | |
|---|---|---|---|---|
| 5,351,812 A | * | 10/1994 | Eagon ........................ | 220/230 |
| 5,917,968 A | * | 6/1999 | Wood ........................ | 385/15 |
| 5,996,831 A | * | 12/1999 | Teok ........................ | 220/230 |
| 6,044,473 A | * | 3/2000 | Kim ........................ | 713/320 |
| 6,115,239 A | * | 9/2000 | Kim ........................ | 361/681 |
| 6,122,152 A | * | 9/2000 | Goto et al. ................ | 361/1 |
| 6,243,819 B1 | * | 6/2001 | Jung ........................ | 713/320 |

* cited by examiner

Primary Examiner—Michael J. Sherry
(74) Attorney, Agent, or Firm—Pillsbury Winthrop LLP (57) ABSTRACT

A magnetic closure mechanism is adapted for use with a portable computer. The portable computer has a first housing part and a second housing part connected pivotally to the first housing part. The first housing part has a first major surface. The second housing part has a second major surface that confronts the first major surface when the second housing part is in a closed position. The magnetic closure mechanism includes a first magnet unit adapted to be provided on the first major surface, a second magnet unit adapted to be provided on the second major surface at a position corresponding to the first magnet unit, and a control unit adapted to provided be on the second housing part. The control unit is connected to the second magnet unit and is operable selectively so as to enable the second magnet unit to attract with the first magnet unit, thereby retaining the second housing part in the closed position, and so as to enable the second magnet unit to repel from the first magnet unit, thereby facilitating movement of the second housing part to an open position away from the first housing part.

6 Claims, 7 Drawing Sheets

MAGNETIC CLOSURE MECHANISM FOR A PORTABLE COMPUTER

BACKGROUND OF THE INVENTION

1. Field of the Invention

The invention relates to a magnetic closure mechanism, more particularly to a magnetic closure mechanism for a portable computer.

2. Description of the Related Art

Figure 1:
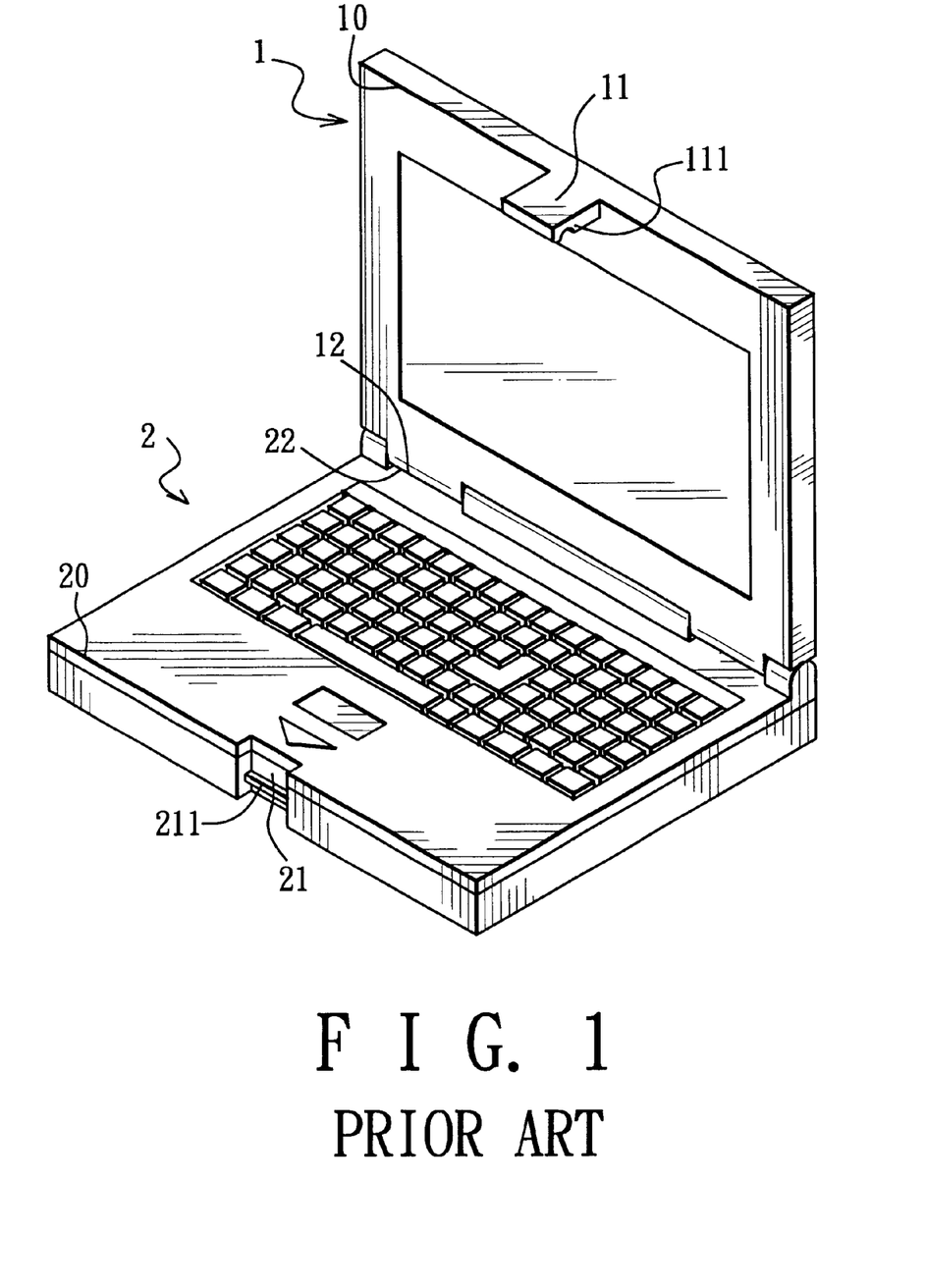
FIG. 1 is a perspective view of a portable computer with conventional closure mechanism.

FIG. 1 illustrates a portable computer with a conventional closure unit. The portable computer includes a main housing part 2 having rear and front ends 22, 20, and a display housing part 1 having a pivot end 12 connected pivotally to the rear end 22 of the main housing part 2 and a free end 10 opposite to the pivot end 12. The display housing part 1 has an engaging piece 11 extending from the free end 10 and formed with an inner engaging groove 111. The front end 20 of the main housing part 2 has a vertically extending indentation 21 disposed at a position corresponding to the engaging piece 11 for receiving the engaging piece 11. An engaging ridge 211 extends horizontally in the indentation 21 for engaging the engaging groove 111 when the display housing part 1 is in a closed position. The engaging piece 11 is forcible so as to disengage the engaging ridge 211 from the engaging groove 111 to permit movement of the display housing part 1 from the closed position to an open position.

However, after being in use for a period of time, wearing of the engaging ridge 211 can easily occur and can lead to unsteady engagement between the engaging ridge 211 and the engaging groove 111.

SUMMARY OF THE INVENTION

Therefore, the object of the present invention is to provide a durable magnetic closure mechanism that can ensure closing and that can facilitate operating of a portable computer.

According to the present invention, a magnetic closure mechanism is adapted for use with a portable computer. The portable computer has a first housing part and a second housing part connected pivotally to the first housing part. The first housing part has a first major surface. The second housing part has a second major surface that confronts the first major surface when the second housing part is in a closed position. The magnetic closure mechanism includes a first magnet unit, a second magnet unit and a control unit.

The first magnet unit is adapted to be provided on the first major surface.

The second magnet unit is adapted to be provided on the second major surface at a position corresponding to the first magnet unit.

The control unit is adapted to be provided on the second housing part. The control unit is connected to the second magnet unit and is operable selectively so as to enable the second magnet unit to attract with the first magnet unit, thereby retaining the second housing part in the closed position, and so as to enable the second magnet unit to repel from the first magnet unit, thereby facilitating movement of the second housing part to an open position away from the first housing part.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
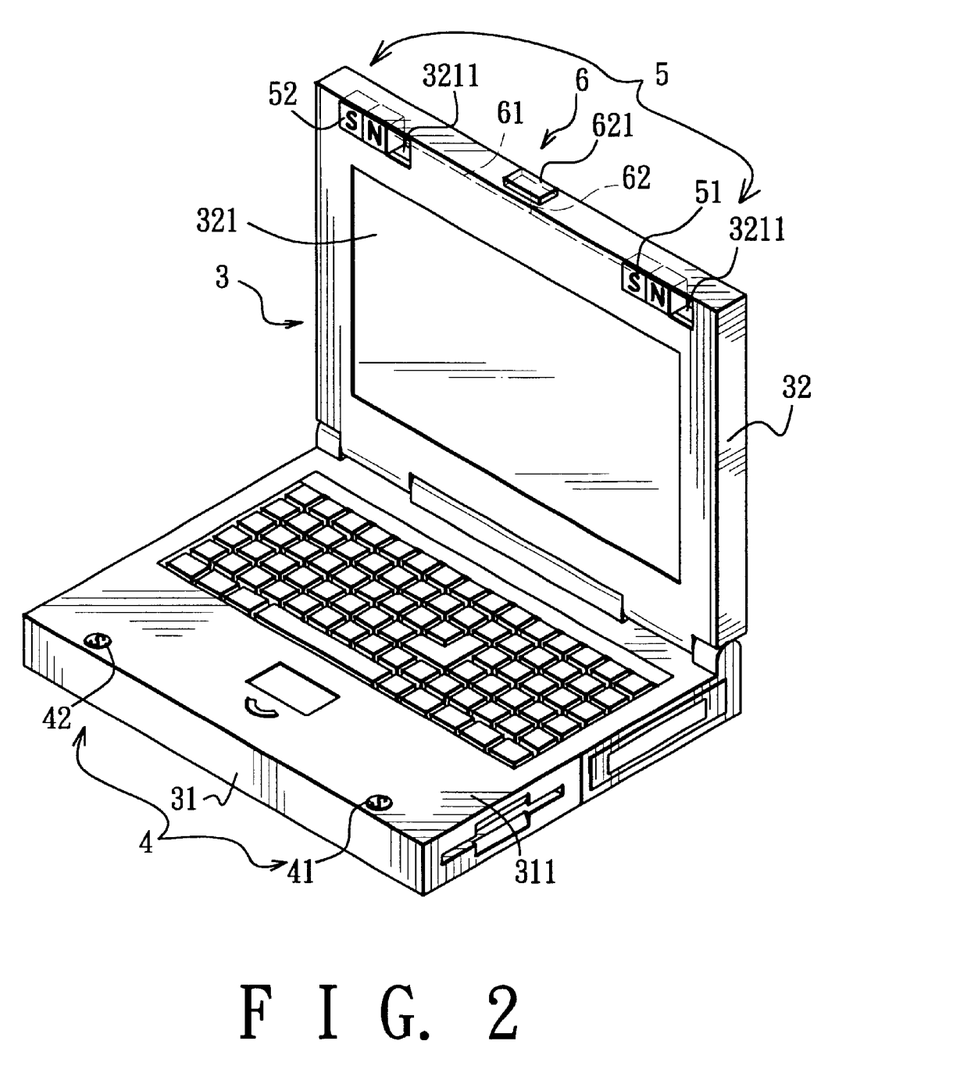
FIG. 2 is a perspective view of a portable computer with the first preferred embodiment of a magnetic closure mechanism according to the present invention.

FIG. 2 illustrates the first preferred embodiment of a magnetic closure mechanism for a portable computer 3. The portable computer 3 has a first housing part 31 receiving a main module (the main module includes a main board, memory, a hard disk, a keyboard, etc.), and a second housing part 32 receiving a LCD module and connected pivotally to the first housing part 31. The first housing part has a first major surface 311. The second housing part 32 has a second major surface 321 that confronts the first major surface 311 when the second housing part 32 is in a closed position. The magnetic closure mechanism includes a first magnet unit 4, a second magnet unit 5 and a control unit 6.

The first magnet unit 4 includes two permanent magnets 41, 42. The magnets 41, 42 are adapted to be provided on the first major surface 311 and are disposed on opposite lateral portions of the first major surface 311. Each of the magnets 41, 42 has opposing N-pole and S-pole end portions. Each of the magnets 41, 42 has an axis transverse to the first major surface 311. In this embodiment, the S-pole end portion of the magnets 41, 42 provides a magnetic force that emanates from the first major surface 311.

The second magnet unit 5 includes two permanent magnets 51, 52. The magnets 51, 52 are adapted to be provided on the second major surface 321 at positions corresponding to the magnets 41, 42 of the first magnet unit 4, respectively. Each of the magnets 51, 52 has opposing N-pole and S-pole end sections. The second magnet unit 5 has an axis parallel to a plane of the second major surface 321. Each of the magnets 51, 52 is adapted to be received in a slide groove 3211 in the second major surface 321 such that each of the magnets 51, 52 is movable therein along the axis of the axis of the second magnet unit 5.

Figure 3:
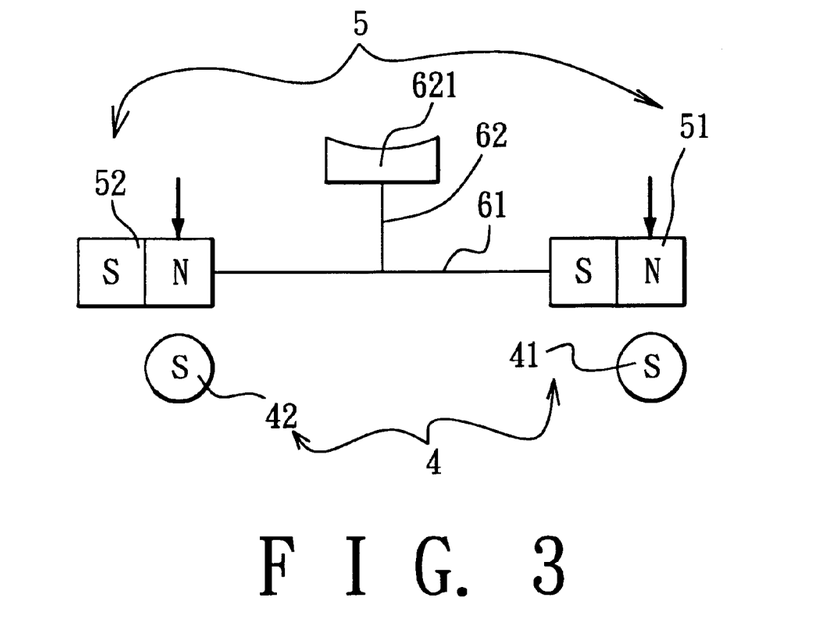
FIG. 3 is a schematic view of the first preferred embodiment in a closed position.
Figure 4:
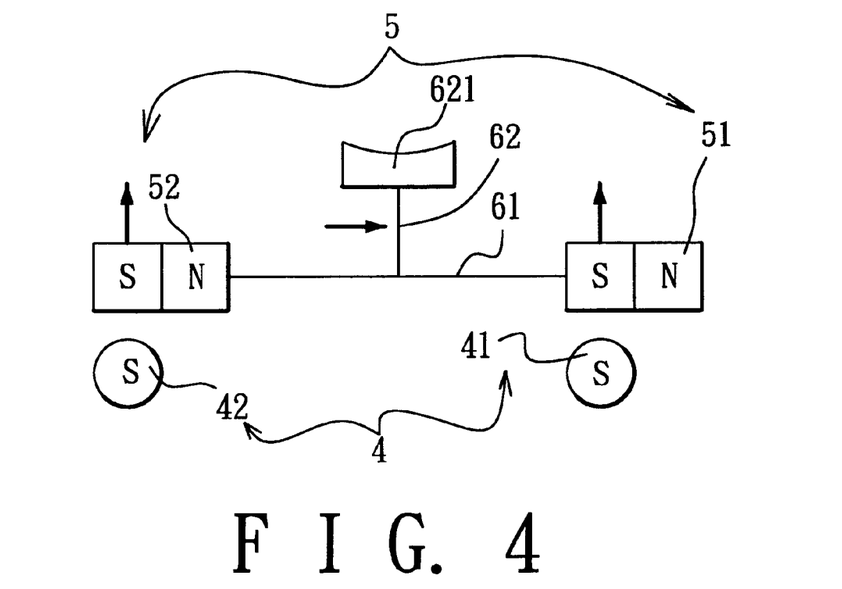
FIG. 4 is a schematic view of the first preferred embodiment in an open position.

The control unit 6 is adapted to be provided on the second housing part 32. In this embodiment, the control unit 6 has a connecting portion 61 and a driving portion 62. The connecting portion 61 is connected to the magnets 51, 52 of the second magnet unit 5 and is adapted to be disposed inside the second housing part 32. The driving portion 62 is connected to the connecting portion 61 and is adapted to be extended outwardly of the second housing part 32. The driving portion 62 has a sliding knob 621 disposed outside the second housing part 32. The driving portion 62 is operable selectively so as to move the second magnet unit 5 via the connecting portion 61 from a retaining position, where the N-pole end sections of the magnets 51, 52 of the second magnet unit 5 are registered with the S-pole end portions of the magnets 41, 42 of the first magnet unit 4, respectively, as shown in FIG. 3, to enable attraction between the first and second magnet units 4, 5, to an opening position, where the S-pole sections of the magnets 51, 52 of the second magnet unit 5 are registered with the S-pole end portions of the magnets 41, 42 of the first magnet unit 4, respectively, as shown in FIG. 4, to enable the first and second magnet units 4, 5 to repel from each other. Therefore, the second housing part 32 can be easily moved away from the first housing part 31.

Figure 5:
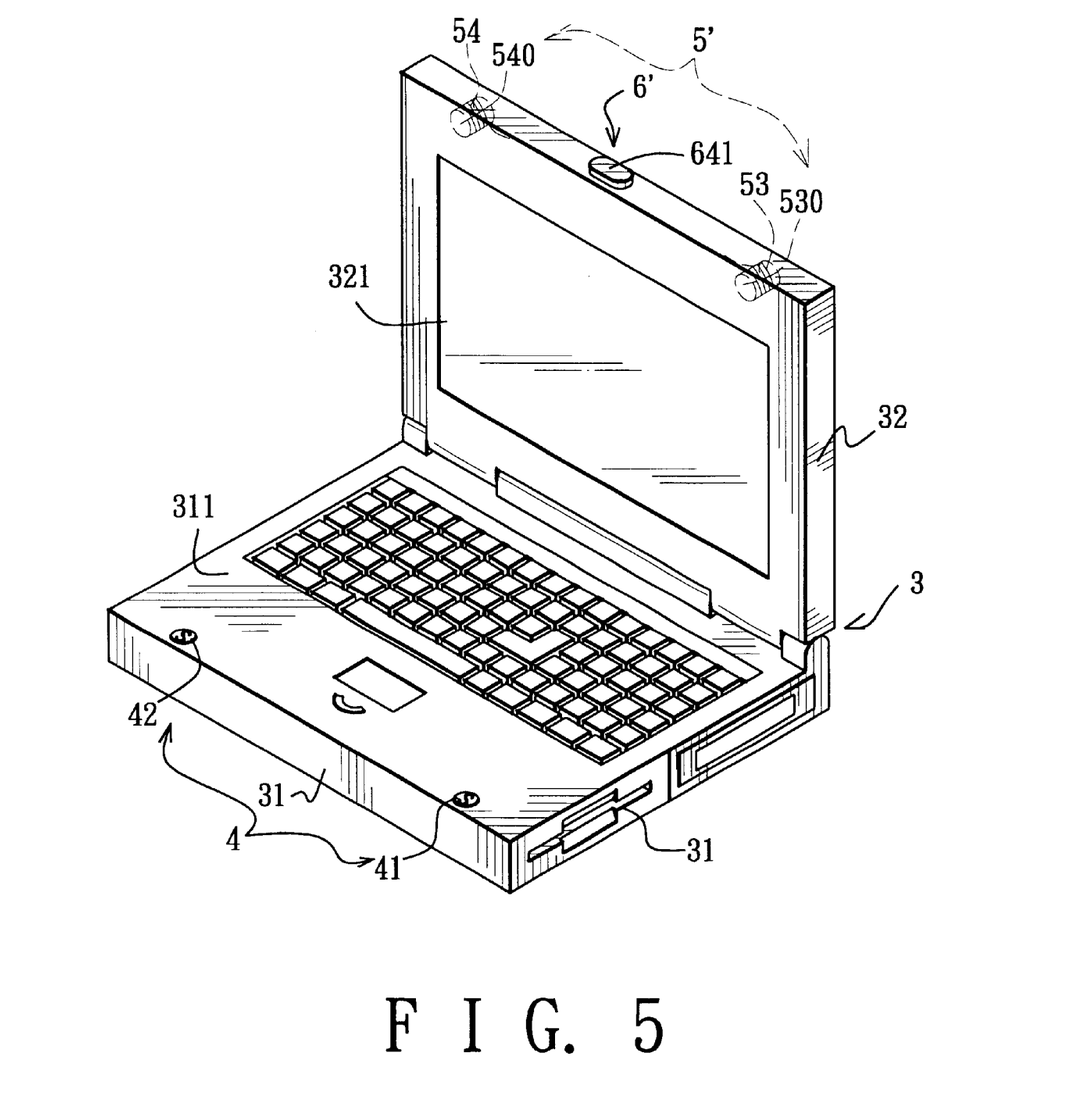
FIG. 5 is a perspective view of a portable computer with the second preferred embodiment of a magnetic closure mechanism according to the present invention.
Figure 6:
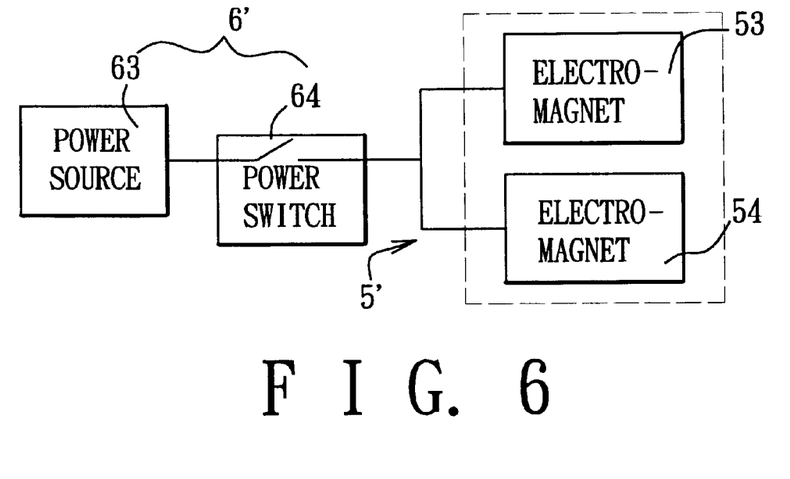
FIG. 6 is a schematic circuit block diagram illustrating the second preferred embodiment.
Figure 7:
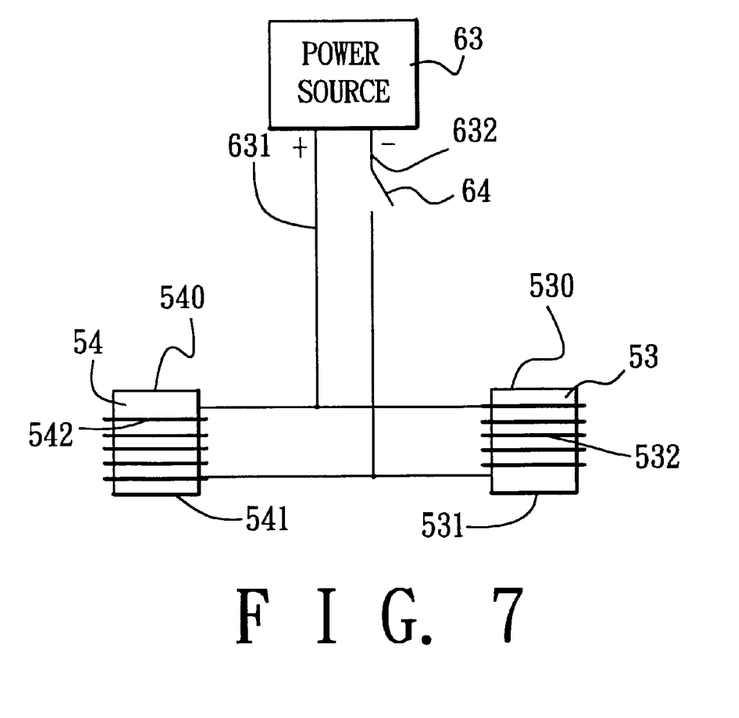
FIG. 7 is a schematic view of the second preferred embodiment, illustrating a control circuit thereof in a de-energizing state.

FIG. 5 illustrates the second preferred embodiment of the present invention, which is a modification the first preferred embodiment. Unlike the previous embodiment, the second magnet unit 5' includes two electromagnets 53, 54. Each of the electromagnets 53, 54 includes a metal core 530, 540 and a conductive wire 532, 542 around the metal core 530, 540. The control unit 6' includes a control circuit connected to the second magnet unit 5' and operable so as to energize the second magnet unit 5'. Referring to FIGS. 5, 6 and 7, the control circuit includes a power source 63, such as a battery or the power source applied to the portable computer 3, and a power switch 64 interconnecting the power source 63 and the second magnet unit 5'. The power switch 64 has an operating knob 641 that is adapted to be disposed outside the second housing part 32 and that is operable so as to enable operation of the control circuit from a de-energizing state, where the power source 63 is disconnected from the second magnet unit 5' to enable the second magnet unit 5' to attract with the first magnet unit 4, to an energizing state, where the power source 63 is connected to the second magnet unit 5' to enable the electromagnets 53, 54 to have the same magnetic polarity as that acting at end portions of the magnets 41, 42 of the first magnet unit 4 so as to repel from the first magnet unit 4. In other words, when the operating knob 641 is not pressed, the control unit 6' is in the de-energizing state such that the first magnet unit 4 attracts with the metal cores 530, 540, thereby retaining the second housing part 32 in the closed position. When the operating knob 641 is pressed, the control unit 6' is in the energizing state such that the electromagnets 53, 54 are S-polarized so as to enable the second magnet unit 5' to repel from the first magnet unit 4, thereby facilitating movement of the second housing part 32 to the open position away from the first housing part 31.

Figure 8:
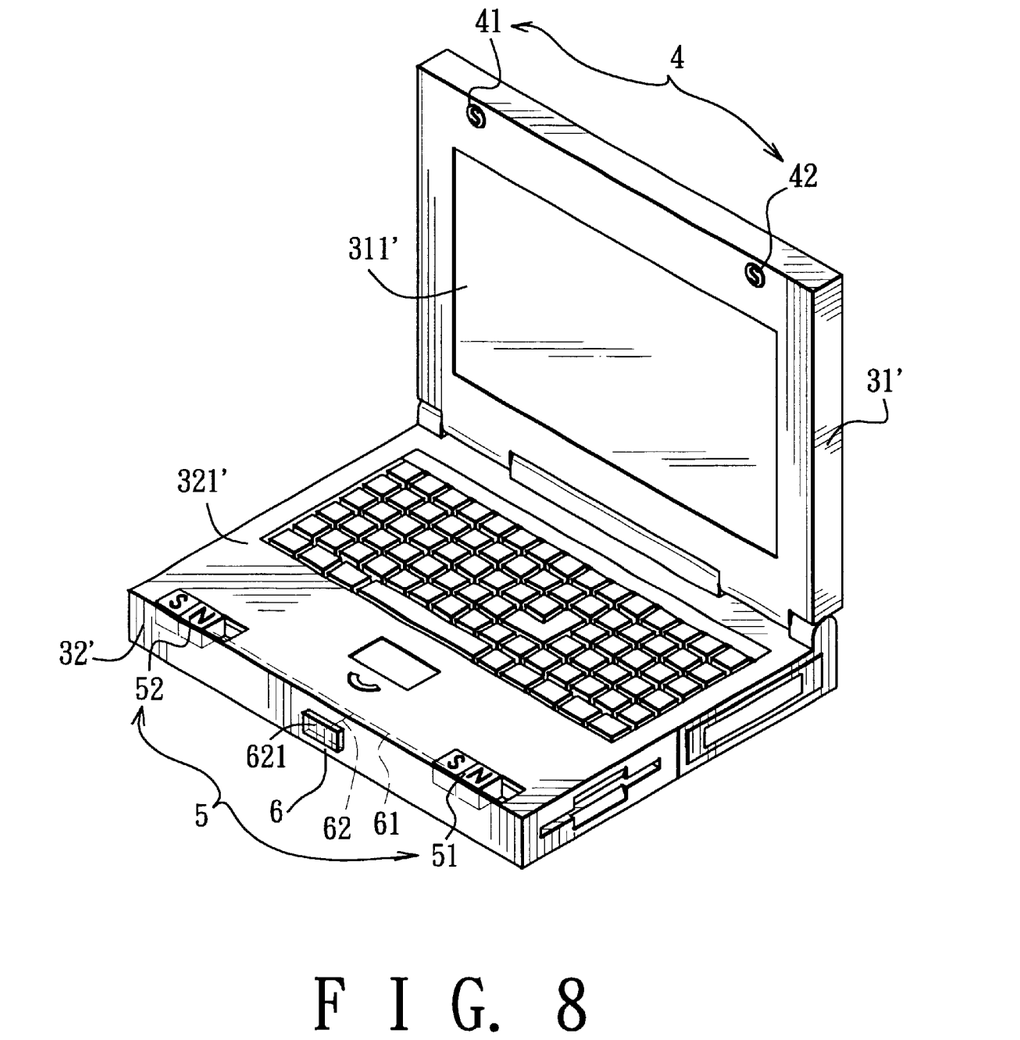
FIG. 8 is a perspective view of a portable computer with the third preferred embodiment of a magnetic closure mechanism according to the present invention.

FIG. 8 illustrates the third preferred embodiment of the present invention, which is a modification of the first preferred embodiment. Unlike the first preferred embodiment, the first housing part 31' receives the main module, whereas the second housing part 32' receives the LCD module.

Figure 9:
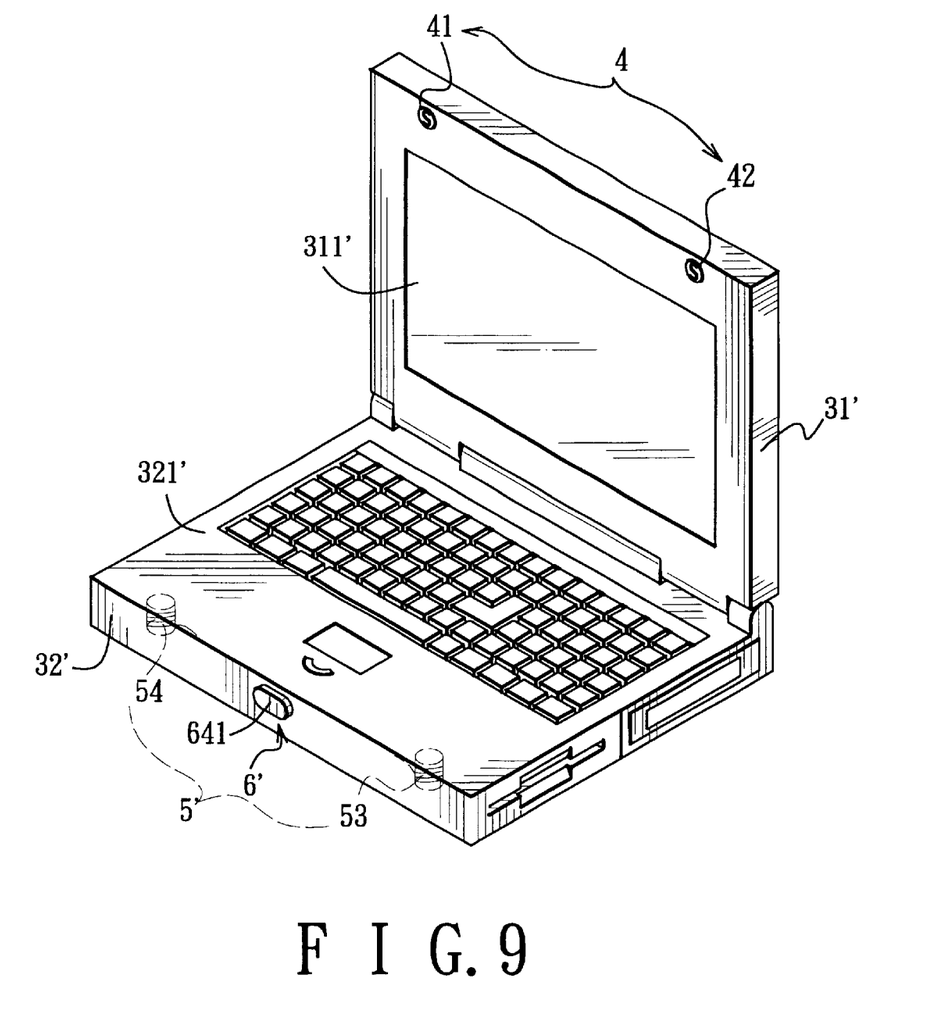
FIG. 9 is a perspective view of a portable computer with the fourth preferred embodiment of a magnetic closure mechanism according to the present invention.

FIG. 9 illustrates the fourth preferred embodiment of the present invention, which is a modification the second preferred embodiment. Unlike the second preferred embodiment, the first housing part 31' receives the main module, whereas the second housing part 32' receives the LCD module.

It is noted that the first magnet unit 4 and the second magnet unit 5, 5' can be designed to contact with each other. Friction that is generated therebetween can be reduced by means of proper surface treatment.

The following are some of the advantages of the present invention:

1. Because of magnetism, the first and second magnet units automatically attract with each other in the closed position and automatically repel from each other in the open position, therefore ensuring retention of the second housing part in the closed position and facilitating movement of the second housing part to the open position away from the first housing part.

2. Wearing of mechanical engagement parts commonly encountered in the prior art can be avoided since magnetism is in use.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A magnetic closure mechanism for a portable computer, the portable computer having a first housing part and a second housing part connected pivotally to the first housing part, the first housing part having a first major surface, the second housing part having a second major surface that confronts the first major surface when the second housing part is in a closed position, said magnetic closure mechanism comprising:

a first magnet unit adapted to be provided on the first major surface; a second magnet unit adapted to be provided on the second major surface at a position corresponding to said first magnet unit; and a control unit adapted to be provided on the second housing part, said control unit being connected to said second magnet unit and being operable selectively so as to enable said second magnet unit to attract with said first magnet unit, thereby retaining the second housing part in the closed position, and so as to enable said second magnet unit to repel from said first magnet unit, thereby facilitating movement of said second housing part to an open position away from the first housing part, wherein said first magnet unit is a permanent magnet having opposing first and second portions with opposite magnetic polarities, and has an axis transverse to said first major surface, said first end portion of said first magnet unit providing a magnetic force that emanates from the first major surface, and wherein said second magnet unit is a permanent magnet having opposing first and second sections with opposite magnetic polarities, said second magnet unit having an axis parallel to a plane of the second major surface and being constructed and arranged so as to be received in a slide groove in the second major surface such that said second magnet unit is movable therein along the axis of said second magnet unit, said control unit having a connecting portion connected to said second magnet unit and adapted to be disposed inside the second housing part, and a driving portion connected to said connecting portion and adapted to be extended outwardly of the second housing part.

2. The magnetic closure mechanism of claim 1, wherein said driving portion is operable so as to move said second magnet unit via said connecting portion from a retaining position, where said first end section of said second magnet unit having a different magnetic polarity as said first end section of said second magnet unit is registered with said first end portion of said first magnet unit to enable attraction between said first and second magnet units, to an opening position, where said second end section of said second magnet unit having the same magnetic polarity as said first end section of said second magnet unit is registered with said first end portion of said first magnet unit to enable said first and second magnet units to repel from each other.

3. A magnetic closure mechanism for a portable computer, the portable computer having a first housing part and a second housing part connected pivotally to the first housing part, the first housing part having a first major surface, the second housing part having a second major surface that confronts the first major surface when the second housing part is in a closed position, said magnetic closure mechanism comprising:

a first magnet unit adapted to be provided on the first major surface; a second magnet unit adapted to be provided on the second major surface at a position corresponding to said first magnet unit; and a control unit adapted to be provided on the second housing part, said control unit being connected to said second magnet unit and being operable selectively so as to enable said second magnet unit to attract with said first magnet unit, thereby retaining the second housing part in the closed position, and so as to enable said second magnet unit to repel from said first magnet unit, thereby facilitating movement of said second housing part to an open position away from the first housing part, wherein said first magnet unit is a permanent magnet having opposing first and second portions with opposite magnetic polarities, and has an axis transverse to said first major surface, said first end portion of said first magnet unit providing a magnetic force that emanates from the first major surface, and wherein said second magnet unit is an electromagnet, and said control unit includes a control circuit connected to said second magnet unit and operable so as to energize said second magnet unit.

4. The magnetic closure mechanism of claim 3, wherein said second magnet unit includes a metal core and a conductive wire around said metal core.

5. The magnetic closure mechanism of claim 3, wherein said control unit includes a power source and a power switch interconnecting said power source and said second magnet unit.

6. The magnetic closure mechanism of claim 5, wherein said power switch has an operating knob that is adapted to be disposed outside the second housing part and that is operable so as to enable operation of said control circuit from a de-energizing state, where said power source is disconnected from said second magnet unit to enable said second magnet unit to attract with said first magnet unit, to an energizing state, where said power source is connected to said second magnet unit to enable said second magnet unit to repel from said first magnet unit.

* * * * *